(12) United States Patent
Smith et al.

(10) Patent No.: US 11,301,251 B2
(45) Date of Patent: Apr. 12, 2022

(54) FETCH STAGE HANDLING OF INDIRECT JUMPS IN A PROCESSOR PIPELINE

(71) Applicant: SiFive, Inc., San Mateo, CA (US)

(72) Inventors: Joshua Smith, San Francisco, CA (US); Krste Asanovic, Berkeley, CA (US); Andrew Waterman, Berkeley, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

(21) Appl. No.: 16/856,462

(22) Filed: Apr. 23, 2020

(65) Prior Publication Data
US 2021/0303300 A1    Sep. 30, 2021

Related U.S. Application Data

(60) Provisional application No. 63/002,307, filed on Mar. 30, 2020.

(51) Int. Cl.
*G06F 9/38*    (2018.01)
*G06F 9/32*    (2018.01)
*G06F 9/30*    (2018.01)

(52) U.S. Cl.
CPC ........ *G06F 9/3806* (2013.01); *G06F 9/30054* (2013.01); *G06F 9/322* (2013.01); *G06F 9/3844* (2013.01); *G06F 9/3867* (2013.01)

(58) Field of Classification Search
CPC ...... G06F 9/3806; G06F 9/322; G06F 9/3848; G06F 9/3844; G06F 9/30054
See application file for complete search history.

(56) References Cited

U.S. PATENT DOCUMENTS

| 6,185,676 B1 | 2/2001 | Poplingher et al. |
| 2013/0290640 A1* | 10/2013 | Aggarwal ................ G06F 1/32 711/125 |

(Continued)

FOREIGN PATENT DOCUMENTS

WO    03003195 A1    1/2003

OTHER PUBLICATIONS

Aneesh Raveendran, Vinayak Baramu Patil, David Selvakumar, and Vivian Desalphine, "A RISC-V Instruction Set Processor—Microarchitecture Design and Analysis", Oct. 20, IEEE, pp. 1-7 (Year: 2016).*

(Continued)

*Primary Examiner* — Courtney P Carmichael-Moody
(74) *Attorney, Agent, or Firm* — Young Basile Hanlon & MacFarlane, P.C.

(57) ABSTRACT

Systems and methods are disclosed for fetch stage handling of indirect jumps in a processor pipeline. For example, a method includes detecting a sequence of instructions fetched by a processor core, wherein the sequence of instructions includes a first instruction, with a result that depends on an immediate field of the first instruction and a program counter value, followed by a second instruction that is an indirect jump instruction; responsive to detection of the sequence of instructions, preventing an indirect jump target predictor circuit from generating a target address prediction for the second instruction; and, responsive to detection of the sequence of instructions, determining a target address for the second instruction before the first instruction is issued to an execution stage of a pipeline of the processor core.

20 Claims, 6 Drawing Sheets

(56) References Cited

U.S. PATENT DOCUMENTS

| | | | | |
|---|---|---|---|---|
| 2014/0281438 A1* | 9/2014 | Abdallah | ............... | G06F 9/3806 |
| | | | | 712/238 |
| 2014/0372736 A1* | 12/2014 | Greenhalgh | ........... | G06F 9/3806 |
| | | | | 712/239 |
| 2017/0060579 A1* | 3/2017 | Vincent | .................. | G06F 9/3871 |
| 2019/0155608 A1* | 5/2019 | Perais | .................... | G06F 9/3806 |

OTHER PUBLICATIONS

"RISC-V Instruction Set Manual, vol. I: Base User-Level ISA", May 13, Electrical Engineering and Computer Sciences University of California at Berkeley, pp. 13-14 (Year: 2011).*

Wikipedia "Branch Target Predictor"; 2 pages; retrieved on Oct. 21, 2020; https://en.wikipedia.org/wiki/Branch_target_predictor.

Santana, et al.; "A Comprehensive Analysis of Indirect Branch Prediction"; ISHPC 2002, LNCS 2327, pp. 133-145, Springer-Verlag Berlin Heidelberg 2002.

Chang et al.; "Target Prediction for Indirect Jumps"; Department of Electrical Engineering & Computer Science, The University of Michigan; 1997 Association for Computing Machinery Inc.; 10 pages.

Farooq, et al.; "Value Based BTB Indexing for Indirect Jump Prediction"; Department of Electrical and Computer Engineering, The University of Texas; HPCA—16 2010 The Sixteenth International Symposium on High Performance Computer Architecture; 11 pages.

Dharmawan, et al.; "Techniques to Improve Indirect Branch Prediction"; ResearchGate; Working Paper Feb. 2016, 7 pages.

International Search Report for PCT application No. PCT/US2021/024603 filed Mar. 29, 2021; dated Jul. 12, 2021. 14 pages.

\* cited by examiner

FETCH STAGE HANDLING OF INDIRECT JUMPS IN A PROCESSOR PIPELINE

CROSS-REFERENCE TO RELATED APPLICATION(S)

This application claims the benefit of U.S. Provisional Application No. 63/002,307, filed on Mar. 30, 2020, which is incorporated herein by reference in its entirety.

TECHNICAL FIELD

This disclosure relates to fetch stage handling of indirect jumps in a processor pipeline.

BACKGROUND

In order to increase performance pipelined processors may include an indirect jump target predictor that generates predictions of target addresses of indirect jump instructions, which may depend on data that may not become available until the indirect jump instruction reaches a later stage of a processor pipeline. The target address predictions may be used to fetch upcoming instructions while waiting for the indirect jump instruction to pass through the pipeline and be retired. Mispredictions of the target addresses may cause problems, including performance penalties and pollution of the state of the indirect jump target predictor.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Described herein are systems and methods for fetch stage handling of indirect jumps in a processor pipeline. In some processor architectures a sequence of instructions including an indirect jump instruction can be used to specify a target address in a large virtual address space. An earlier instruction in the sequence can add an immediate to value to a program counter value. The result can then be added to a second immediate included in the indirect jump instruction and shifted to allow a large range of jumps in relation to the program counter value. This sequence of instructions forms an immediate jump for which the target address can be determined based on immediates and a program counter value, which is information that will be available in a fetch stage of a processor pipeline. For example, in the RISC-V instruction set, a sequence of instructions including an AUIPC instruction followed by a JALR instruction form an immediate jump. However, an indirect jump target predictor circuit may generate a target address prediction for the indirect jump instruction of the sequence of instructions. This may waste power in the indirect jump target predictor circuit and may also result in occasional mispredictions of target addresses that cause performance penalties and/or pollute the predictor state of the indirect jump target predictor circuit.

Some implementations, solve or mitigate these problems by adding circuitry to a processor core to detect these sequences of instructions forming an immediate jump and determining the target address of the indirect jump of the sequence of instructions in a fetch stage of a processor pipeline. For example, the determined target address may be inserted in a fetch target queue and used in lieu of a target address prediction from an indirect jump target predictor circuit of the processor core. In some implementations, the indirect jump target predictor circuit may be disabled when the indirect jump instruction of the sequence of instructions is being fetched to prevent the indirect jump target predictor circuit from wasting power generating a target address prediction for the indirect jump instruction. For example, the sequence of instructions may be detected in an earlier stage of a pipeline with multiple fetch stages, such as when a cacheline of instructions s being loaded into an L1 instruction cache. This early detection may allow an immediate jump hint to be generated that will be available early enough to control an enable input of the indirect jump target predictor circuit as the sequence of instructions is being read out of the L1 instruction cache and disable the indirect jump target predictor circuit.

Another technique for reducing power consumption in an indirect jump target predictor circuit is to detect the presence or absence of indirect jump instructions in a cacheline as the cacheline is being loaded into an L1 instruction cache to generate and indirect jump hint that can be used in a later fetch stage of a processor pipeline to enable or disable the indirect jump target predictor circuit. That is, if no indirect jump instruction is detected in the cacheline, the disable the indirect jump target predictor circuit when reading out instructions from the cacheline. This technique may be combined with the immediate jump handling described above and elsewhere herein. For example, an enable input of an indirect jump target predictor circuit may be set to an inactive level if an indirect jump hint indicates the absence of indirect jump instructions or an immediate jump hint indicates the presence of a sequence of instructions forming an immediate jump.

In some implementations, the techniques for fetch stage handling of indirect jumps in a processor pipeline may be used to realize one or more advantages over conventional processors. For example, the structures and techniques described herein may reduce power consumption in a processor core, reduce pollution of a predictor state of an indirect jump target predictor circuit, and/or improve performance of a processor core.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

Figure 1:
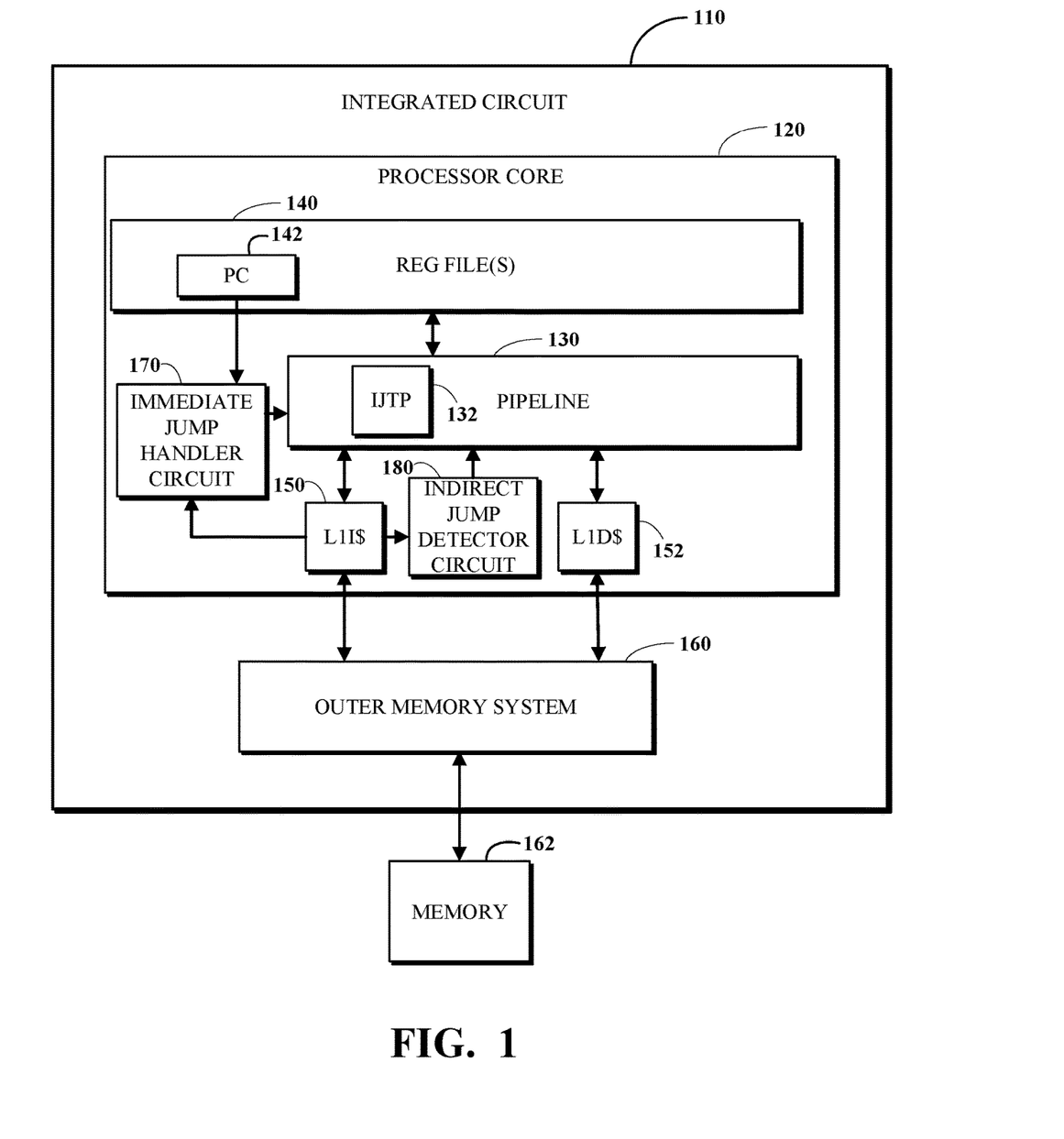
FIG. 1 is a block diagram of an example of an integrated circuit for executing instructions using fetch stage handling of indirect jumps in a processor pipeline.

FIG. 1 is a block diagram of an example of an integrated circuit 110 for executing instructions using fetch stage handling of indirect jumps in a processor pipeline. The integrated circuit 110 includes a processor core 120. The processor core 120 includes a processor pipeline 130 that includes an indirect jump target predictor circuit 132 configured to generate predictions for target addresses of fetched indirect jump instructions. The processor core 120 includes one or more register files 140 that include a program counter 142. The processor core 120 includes an L1 instruction cache 150 and an L1 data cache 152. The integrated circuit 110 includes an outer memory system 160, which may include memory storing instructions and data and/or provide access to a memory 162 external to the integrated circuit that stores instructions and/or data. The processor core 120 includes an immediate jump handler circuit 170, which may be configured to detect sequences of instructions including a indirect jump instruction that has a target address that can be determined based on information available in a fetch stage of the pipeline 130, and determine this target address in a fetch stage of the pipeline to be used in lieu of a prediction of the target address. The processor core 120 includes an indirect jump detector circuit 180, which may be configured to check for indirect jump instructions in cachelines as they are loaded into the L1 instruction cache 150 and disable the indirect jump target predictor circuit 132 when cachelines without indirect jumps are read from the L1 instruction cache 150 to save power. The integrated circuit 110 may provide advantages over conventional processor architectures, such as, for example, avoiding mispredictions of target addresses and resulting pollution of an indirect jump predictor and performance degradation, and/or conservation of power consumption. For example, the integrated circuit 110 may implement the process 400 of FIG. 4. For example, the integrated circuit 110 may implement the process 600 of FIG. 6.

The integrated circuit 110 includes a processor core 120 including a processor pipeline 130 configured to execute instructions. The pipeline 130 includes one or more fetch stages that are configured to retrieve instructions from a memory system of the integrated circuit 110. For example, the pipeline 130 may fetch instructions via the L1 instruction cache 150. For example, the pipeline 130 may include the processor pipeline 200 of FIG. 2. The pipeline 130 may include additional stages, such as decode, rename, dispatch, issue, execute, memory access, and write-back stages. For example, the processor core 120 may include a pipeline 130 configured to execute instructions of a RISC V instruction set.

The integrated circuit 110 includes an indirect jump target predictor circuit 132 in a fetch stage of the pipeline 130 configured to generate predictions for target addresses of fetched indirect jump instructions. For example, the indirect jump target predictor circuit 132 may be the indirect jump target predictor circuit 220 of FIG. 2. For example, the indirect jump target predictor circuit 132 may output the predictions to a fetch target queue.

The indirect jump target predictor circuit 132 is a structure used to predict the target of indirect jump instructions (e.g., RISC-V JALR instructions). For example, the indirect jump target predictor circuit 132 may be an ITTAGE-style predictor, which is similar in design to a branch direction predictor (BDP). However, as opposed to predicting branch direction, the indirect jump target predictor circuit 132 provides target addresses. For example, the indirect jump target predictor circuit 132 may be SRAM-based, and to be more area efficient may be designed to use single-ported memories. In some implementations, there is no structural hazard between prediction and updates on the indirect jump target predictor circuit 132.

The integrated circuit 110 includes one or more register files 140 that include a program counter 142 for the processor core 120. For example, the program counter 142 may be stored in a register. For example, the program counter 142 may be stored using a program counter map table that is used to keep track of program counter for instructions in a reorder buffer window.

The integrated circuit 110 includes an L1 instruction cache 150 for the processor core 120. The L1 instruction cache 150 may be a set-associative cache for instruction memory. To avoid the long latency of reading a tag array and a data array in series, and the high power of reading the arrays in parallel, a way predictor may be used. The way predictor may be accessed in an early fetch stage (e.g., the F1 stage 204 of the processor pipeline 200 of FIG. 2) and the hit way may be encoded into the read index of the data array. The tag array may be accessed in later fetch stage (e.g., the F2 stage 206 of the processor pipeline 200 of FIG. 2) and is only used for verifying the way predictor.

The integrated circuit 110 includes an L1 data cache 152 for the processor core 120. For example, the L1 data cache 152 may be a set-associative VIPT cache, meaning that it is indexed purely with virtual address bits VA[set] and tagged fully with all translate physical address bits PA[msb:12]. For low power consumption, the tag and data arrays may be looked up in serial so that at most a single data SRAM way is accessed. For example, the line size of the L1 data cache 152 may be 64 Bytes, and the beat size may be 16 Bytes.

The integrated circuit 110 includes an outer memory system 160, which may include memory storing instructions and data and/or provide access to a memory 162 external to the integrated circuit that stores instructions and/or data. For example, the outer memory system 160 may include an L2 cache, which may be configured to implement a cache coherency protocol/policy to maintain cache coherency across multiple L1 caches. Although not shown in FIG. 1, the integrated circuit 110 may include multiple processor cores in some implementations. For example, the outer memory system 160 may include multiple layers.

The integrated circuit 110 includes an immediate jump handler circuit 170. The immediate jump handler circuit 170 may be configured to detect a sequence of instructions fetched by the processor core 120, wherein the sequence of instructions includes a first instruction with a result that depends on an immediate field of the first instruction and a program counter value followed by a second instruction that is an indirect jump instruction. In some implementations, the processor core 120 is configured to execute instructions of a RISC V instruction set and the first instruction is an AUIPC instruction and the second instruction is a JALR instruction. The immediate jump handler circuit 170 may be configured to, responsive to detection of the sequence of instructions, prevent the indirect jump target predictor circuit from generating a target address prediction for the second instruction. The immediate jump handler circuit 170 may be configured to, responsive to detection of the sequence of instructions, determine a target address for the second instruction before the first instruction is issued to an execution stage of the pipeline. The immediate jump handler circuit 170 may be configured to write the target address to a fetch target queue that is configured to receive predictions from the indirect jump target predictor circuit 132. For example, the target address for the second instruction may be determined before the first instruction reaches a decode stage of the processor pipeline 130. For example, the immediate jump handler circuit 170 may include the immediate jump scanning circuit 230 and the immediate jump determination circuit 232 of FIG. 2.

For example, the immediate jump handler circuit 170 may detect the sequence of instructions before they enter the fetch stage that includes the indirect jump target predictor circuit 132. In some implementations, the processor pipeline 130 includes multiple fetch stages, the immediate jump handler circuit 170 detects the sequence of instructions as they pass through an early fetch stage that is earlier in the processor pipeline 130 than the fetch stage that includes the indirect jump target predictor circuit 132. The immediate jump handler circuit 170 may be configured to, responsive to detection of the sequence of instructions, disable the indirect jump target predictor circuit 132. For example, the immediate jump handler circuit 170 may be configured to update a status bit in an instruction cache tag, which causes the indirect jump target predictor circuit 132 to be disabled when the second instruction enters the fetch stage of the pipeline that includes the indirect jump target predictor circuit 132. For example, the immediate jump handler circuit 170 may be configured to update a status bit in an instruction cache way predictor, which causes the indirect jump target predictor circuit 132 to be disabled when the second instruction enters the fetch stage of the pipeline that includes the indirect jump target predictor circuit 132.

For example, the immediate jump handler circuit 170 may be configured to detect the sequence of instructions by scanning values stored in a cacheline of the L1 instruction cache 150. In some implementations, the immediate jump handler circuit 170 is configured to detect the sequence of instructions by scanning values appearing on a memory bus as instructions are being input to the L1 instruction cache 150 via the memory bus.

In some implementations, the immediate jump handler circuit 170 is configured to: detect a sequence of instructions fetched by the processor core 120, wherein the sequence of instructions includes an AUIPC instruction followed by a JALR instruction; responsive to detection of the sequence of instructions, disable the indirect jump target predictor circuit 132 to prevent the indirect jump target predictor circuit 132 from generating a target address prediction for the JALR instruction; responsive to detection of the sequence of instructions, determine a target address for the JALR instruction before the AUIPC instruction is issued to an execution stage of the pipeline 130; and write the target address to the fetch target queue in an entry corresponding to the JALR instruction.

The integrated circuit 110 includes an indirect jump detector circuit 180 configured to: check a cacheline for an indirect jump instruction by scanning values appearing on a memory bus as the cacheline is being input to an instruction cache via the memory bus; update, based on the check, a hint bit associated with the cacheline to indicate absence of the indirect jump instruction in the cacheline; and, based on the hint bit, disable the indirect jump target predictor circuit 132 to prevent the indirect jump target predictor circuit 132 from generating a target address prediction when instructions of the cacheline enter a stage of the pipeline that includes the indirect jump target predictor circuit 132. For example, the indirect jump instruction may be a JALR instruction of a RISC V instruction set. For example, the hint bit may be stored in an instruction cache way predictor (e.g., in the L1 instruction cache 150). For example, the hint bit may be stored in an instruction cache tag (e.g., in the L1 instruction cache 150). The indirect jump detector circuit 180 may serve to save power by disabling the indirect jump target predictor circuit 132 at times when no indirect jump instruction is being fetched. For example, the indirect jump detector circuit 180 may be configured to implement the process 600 of FIG. 6.

Figure 2:
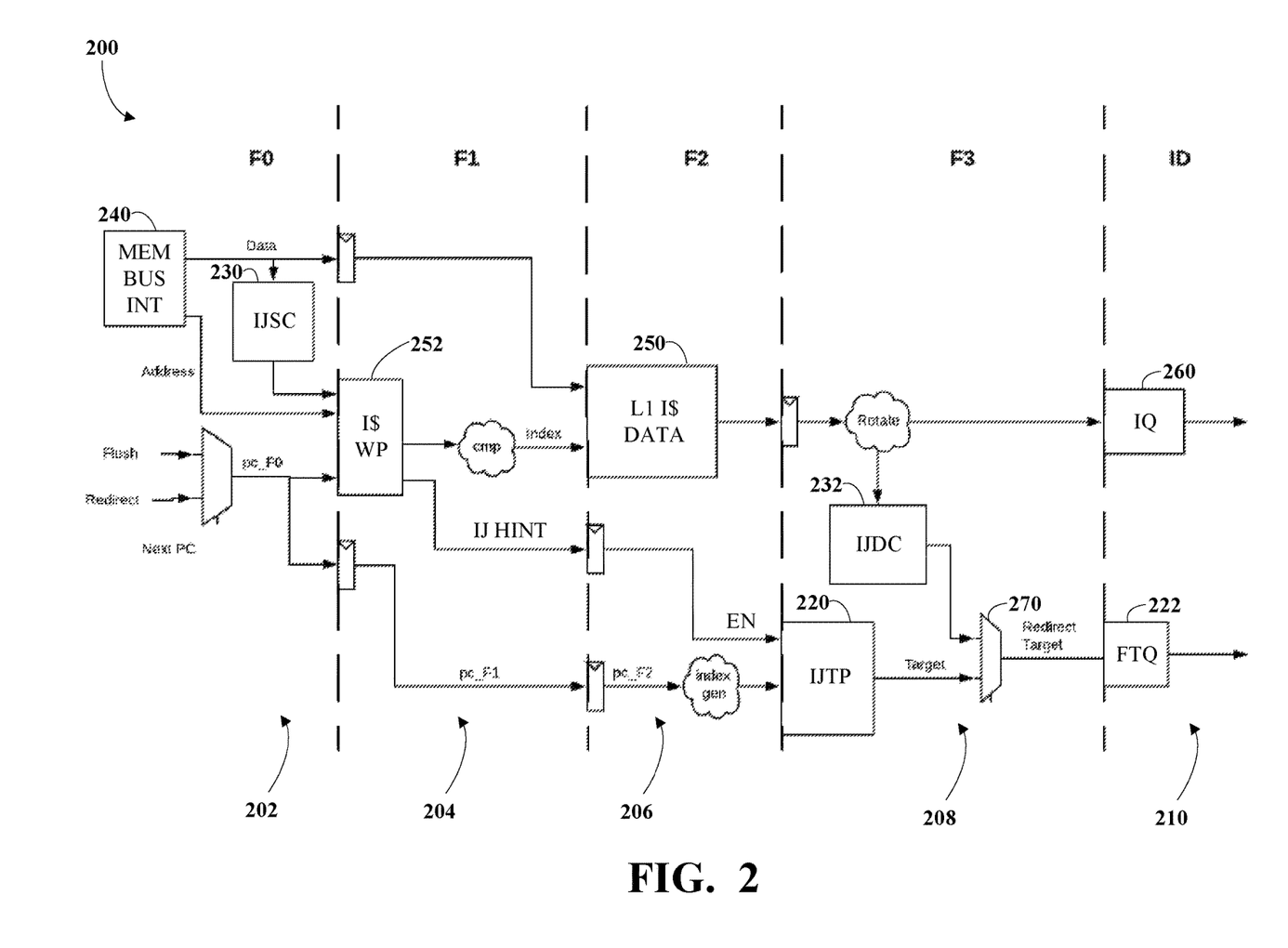
FIG. 2 is a block diagram of an example of a portion of a processor pipeline for executing instructions using fetch stage handling of indirect jumps.

FIG. 2 is a block diagram of an example of a portion of a processor pipeline 200 for executing instructions using fetch stage handling of indirect jumps. The processor pipeline 200 includes multiple fetch stages: an F0 stage 202, an F1 stage 204, an F2 stage 206, and an F3 stage 208. The processor pipeline 200 includes a decode stage 210 following the fetch stages 202 through 208. Although not shown in FIG. 2, the processor pipeline 200 may include additional stages, such as, rename, dispatch, issue, execute, memory access, and write-back stages.

The processor pipeline 200 includes an indirect jump target predictor circuit 220 in the F3 stage 208 of the pipeline 200 configured to generate predictions for target addresses of fetched indirect jump instructions. The processor pipeline 200 includes a fetch target queue 222 for storing target address predictions from the indirect jump target predictor circuit 220 for use in later stages of the pipeline 200. The indirect jump target predictor circuit 220 is a structure used to predict the target of indirect jump instructions (e.g., RISC-V JALR instructions). The encoding of the source register and destination register fields of the indirect jump instruction may provide hints as to the usage of the indirect jump instruction as a function call or return. In some implementations, the indirect jump target predictor circuit 220 does not predict the targets of function returns, instead a Return Address Stack (RAS) is used. For example, the indirect jump target predictor circuit 220 may be an ITTAGE-style predictor, which is similar in design to a branch direction predictor (BDP). However, as opposed to predicting branch direction, the indirect jump target predictor circuit 220 provides target addresses. For example, the indirect jump target predictor circuit 220 may be SRAM-based, and to be more area efficient may be designed to use single-ported memories. In some implementations, there is no structural hazard between prediction and updates on the indirect jump target predictor circuit 220.

As an area optimization, it may be observed that it is likely the indirect jump target predictor circuit 220 will only need to reference a small number of memory ranges within a given window of time. The indirect jump target predictor circuit 220 may use a level of indirection to compress the storage of the upper target virtual address bits. In some implementations, each entry in the indirect jump target predictor circuit 220 may therefore only keep a certain number of lower bits and a reference to a table containing the upper bits. This table is referred to as a High Array.

For example, the indirect jump target predictor circuit 220 may maintain a table with respective entries that include: an index into a High Array, which stores upper target bits; low bits of target program counter (PC); and a tag, which may be a hashed tag. Each entry in the indirect jump target predictor circuit 220 may also have a counter (e.g., 1 bit or 2 bits), which is used for indicating the usefulness of each entry and affects the replacement policy. These counter bits are stored in flop arrays.

To avoid needing to store the resolved target of each indirect jump instruction (e.g., JALR) in a branch resolution queue, the indirect jump target predictor circuit 220 may be updated directly after the branch unit resolves the jump instead of at retirement. When an indirect jump target predictor circuit 220 jump issues to the branch unit, the branch resolution queue index is sent back to the branch resolution queue and the indirect jump target predictor circuit 220 prediction information (e.g., counter bits and provider table index) are read out of the branch resolution queue. When the indirect jump instruction is in a write back stage, an update request may be sent to the indirect jump target predictor circuit 220. For example, the update pipeline therefore may be as follows: at an issue stage, a branch unit sends the branch resolution queue index back to the branch resolution queue; at a register read stage, the indirect jump target predictor circuit 220 prediction information is read from the branch resolution queue; at an execution stage, the indirect jump target predictor circuit 220 update request is constructed and flopped into write back; and, in a write back stage, send update request to the indirect jump target predictor circuit 220 along with misprediction indication. The indirect jump target predictor circuit 220 may re-compute table indices and tags, and CAM high array using upper target bits.

If the indirect jump target predictor circuit 220 gets an update for a correctly predicted jump, it may set the counter bit for the provider entry. If the target was mispredicted, the indirect jump target predictor circuit 220 may update the provider entry if the counter bit was zero, or decrement the counter bit if not. The indirect jump target predictor circuit 220 may also attempt to allocate into a higher table than the provider table. For example, starting from the next highest-indexed table, the counter bits may be scanned. If a table has a counter of zero, then the indirect jump target predictor circuit 220 may allocate into that table. If all counter bits are set, then a failed allocation may be signaled. A saturating counter may be incremented on a failed allocation, and decremented on a successful allocation. Saturation of the counter indicates trouble installing new entries into the indirect jump target predictor circuit 220 due to long-lived entries. If saturation occurs, the counter bit arrays for all entries of the indirect jump target predictor circuit 220 may be flash cleared so that new useful entries may be installed. In some implementations, each entry of the indirect jump target predictor circuit 220 only stores a portion of the target address. When allocating into the indirect jump target predictor circuit 220, the High Array may be CAM'd with the upper bits of the resolved target. If a matching entry is found, the index of that entry may be written to the hiIdx field of the entry in the jump target predictor circuit 220. If no matching entry is found, an entry of the High Array is allocated according to a Pseudo-LRU replacement policy, and this index is written to the hiIdx field.

The processor pipeline 200 includes an immediate jump handler circuit, including an immediate jump scanning circuit 230 and an immediate jump determination circuit 232. The immediate jump scanning circuit 230 may be configured to detect sequences if instructions that form an indirect jump with a target address that can be determined based on information available in the fetch stages. The sequence of instructions includes a first instruction, with a result that depends on an immediate field of the first instruction and a program counter value, followed by a second instruction that is an indirect jump instruction. For example, in RISC-V processor core, the sequence of instructions may include an AUIPC instruction followed by a JALR instruction. The immediate jump scanning circuit 230 is configured to detect the sequence of instructions by scanning values appearing on a memory bus from the memory bus interface 240 as instructions are being input to an L1 instruction cache 250 via the memory bus. Upon detecting the sequence of instructions, the immediate jump scanning circuit 230 may update a status bit in an instruction cache way predictor 252 to indicate that a cacheline associated with the status bit includes the sequence of instructions. Updating the status bit may cause the indirect jump target predictor circuit to be disabled when the second instruction enters the F3 stage 208 of the pipeline 200 that includes the indirect jump target predictor circuit 220.

When this cacheline is later read out from the L1 instruction cache 250 in the F2 stage 206, the value of this status bit may be passed via a pipeline register as a immediate jump hint to enable input of the indirect jump target predictor circuit 220 that will be available in time for use at the F3 stage 208, which may save power by preventing the indirect jump target predictor circuit 220 from running to generate a target address prediction for an indirect jump instruction of the sequence of instructions. Thus, the immediate jump scanning circuit 230 detects the sequence of instructions before they enter the F3 stage 208 that includes the indirect jump target predictor circuit 220. The immediate jump scanning circuit 230 is configured to, responsive to detection of the sequence of instructions, disable the indirect jump predictor by passing of the immediate jump hint stored in the status bit of the instruction cache way predictor 252 for use in an enable input of the indirect jump target predictor circuit 220 when the corresponding cacheline is read out of the L1 instruction cache 250.

After the cacheline is read out of the L1 instruction cache 250, the cacheline may be rotated in the F3 stage 208 to access relevant instructions, which may be input to an instruction queue 260 that holds instructions for decode and also input to the immediate jump determination circuit 232. The immediate jump determination circuit 232 is configured to detect the sequence of instructions and determine a target address for the indirect jump instruction of the sequence of instructions based on an immediate and a program counter value of the sequence of instructions. The processor pipeline 200 includes a multiplexor 270 that is used to select the target address determined by the immediate jump determination circuit 232 and write the target address to the fetch target queue 222 in lieu of a target address prediction from the indirect jump target predictor circuit 220 for the indirect jump instruction of the sequence of instructions.

Figure 3:
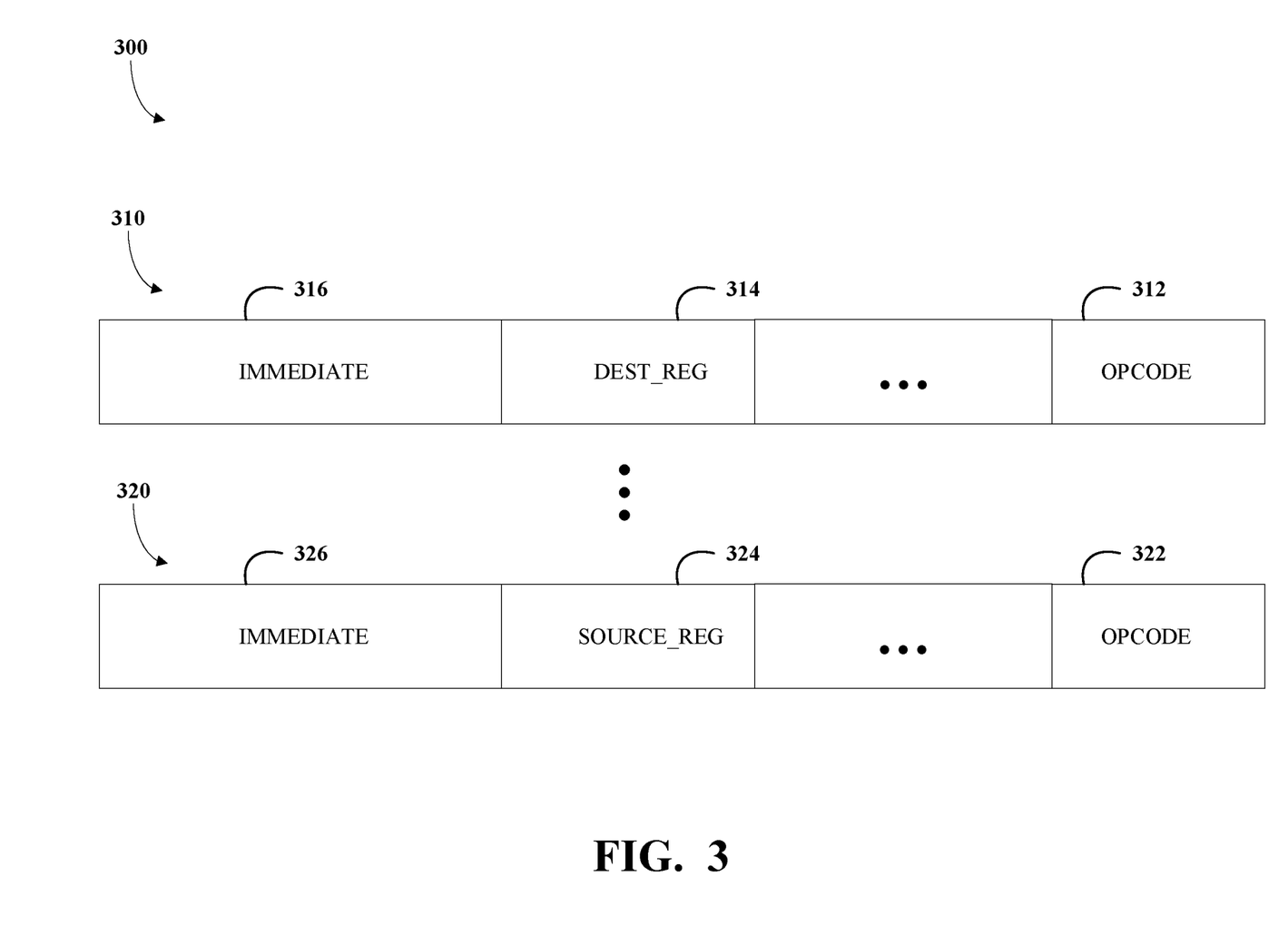
FIG. 3 is a memory map of an example of a sequence of instructions that includes a first instruction with a result that depends on an immediate field of the first instruction and a program counter value followed by a second instruction that is an indirect jump instruction.

FIG. 3 is a memory map of an example of a sequence of instructions 300 that includes a first instruction 310 with a result that depends on an immediate field of the first instruction and a program counter value followed by a second instruction 320 that is an indirect jump instruction. The first instruction 310 includes an opcode 312, a destination register field 314 that identifies an architectural register to be used to store a result of the first instruction 310, and an immediate 316 that is to be combined with (e.g., added to) a program counter value to determine the result of the first instruction. The second instruction 320 includes an opcode 322, a source register field 324 that identifies an architectural register to be accessed, and an immediate 326 that is to be combined with (e.g., added to) a value stored in the source register 324 to determine a target address of the second instruction. For example, in a RISC-V processor core, the first instruction may be an AUIPC instruction and the second instruction may be a JALR instruction.

In some implementations, the first instruction 310 is adjacent to the second instruction 320 in memory and thus the second instruction 320 immediately follows the first instruction 310. In some implementations, there may be one or more additional intervening instructions stored in memory locations between the first instruction 310 and the second instruction 320 and thus the second instruction 320 follows the first instruction 310, but does not immediately follow the first instruction 310. Where the one or more intervening instructions do not write to destination register 314 before it is accessed as the source register 324, the sequence of instructions 300 may still function as an immediate jump, for which the target address may be determined during a fetch stage of a processor pipeline (e.g., the processor pipeline 130).

Figure 4:
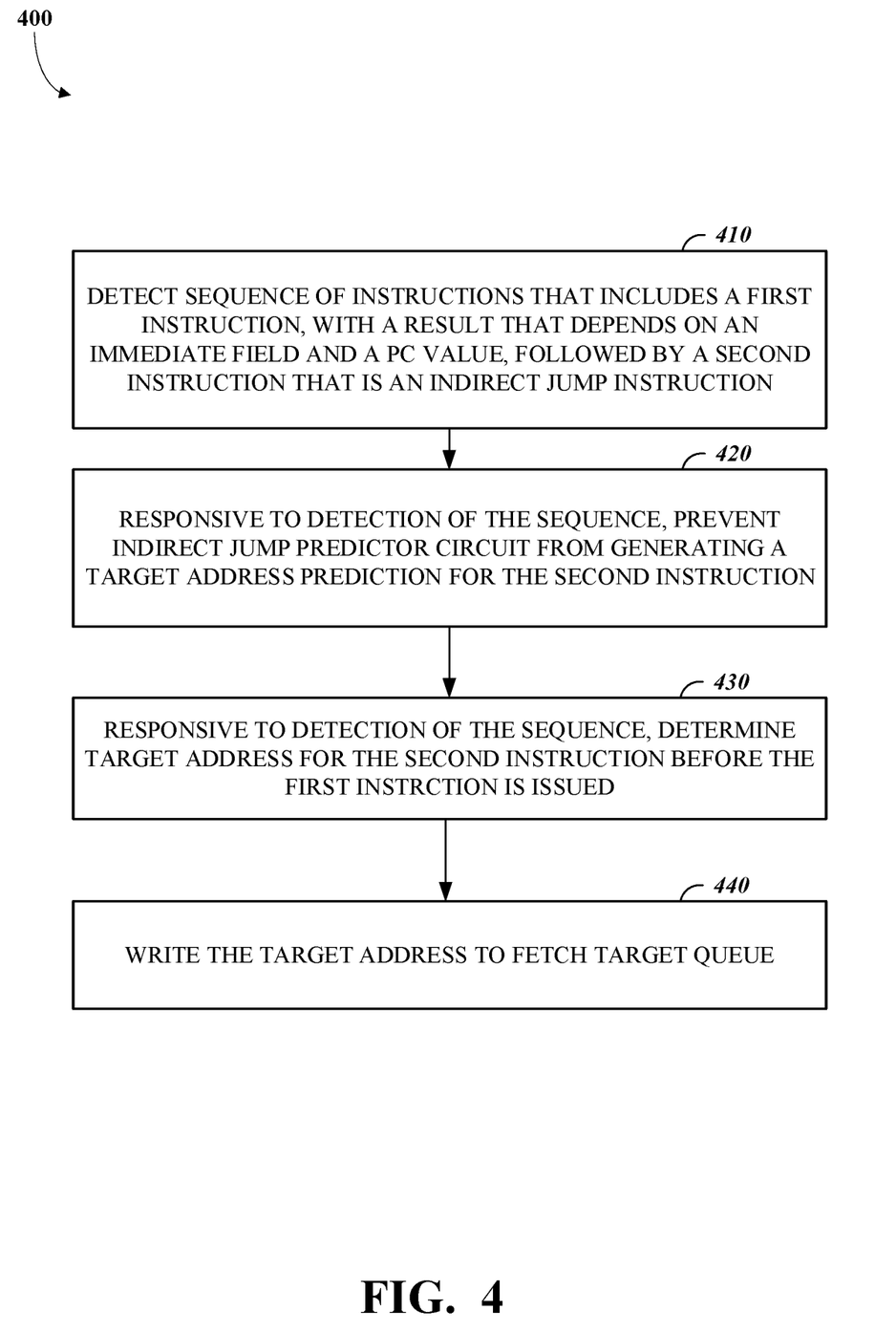
FIG. 4 is a flow chart of an example of a process for fetch stage handling of indirect jumps.

FIG. 4 is a flow chart of an example of a process 400 for fetch stage handling of indirect jumps. The process 400 includes detecting 450 a sequence of instructions fetched by a processor core that includes a first instruction, with a result that depends on an immediate field of the first instruction and a program counter value, followed by a second instruction that is an indirect jump instruction; responsive to detection of the sequence of instructions, preventing 420 an indirect jump target predictor circuit from generating a target address prediction for the second instruction; responsive to detection of the sequence of instructions, determining a target address for the second instruction before the first instruction is issued; and writing 440 the target address to a fetch target queue. The process 400 may provide advantages over conventional techniques, such as, for example, avoiding mispredictions of target addresses and resulting pollution of an indirect jump predictor and performance degradation, and/or conservation of power consumption. For example, the process 400 may be implemented using the integrated circuit 110 of FIG. 1. For example, the process 400 may be implemented using the processor pipeline 200 of FIG. 2.

The process 400 includes detecting 410 a sequence of instructions fetched by a processor core (e.g., the processor core 120). The sequence of instructions includes a first instruction, with a result that depends on an immediate field of the first instruction and a program counter value, followed by a second instruction that is an indirect jump instruction. For example, the processor core may be configured to execute instructions of a RISC V instruction set and the first instruction is an AUIPC instruction and the second instruction is a JALR instruction. In some implementations, detecting 410 the sequence of instructions fetched by the processor core includes detecting the sequence of instructions by scanning values appearing on a memory bus as instructions are being input to an instruction cache (e.g., the L1 instruction cache 250) via the memory bus. In some implementations, detecting 410 the sequence of instructions fetched by the processor core includes detecting the sequence of instructions by scanning values stored in a cacheline of an instruction cache. For example, the sequence of instructions may be detected 410 before they enter a fetch stage (e.g., the F3 stage 208 of the processor pipeline 200) that includes an indirect jump target predictor circuit (e.g., the indirect jump target predictor circuit 220). In some implementations, the pipeline includes multiple fetch stages, the sequence of instructions is detected as they pass through an early fetch stage (e.g., the F0 stage 202 of the processor pipeline 200) that is earlier in the pipeline than a fetch stage (e.g., the F3 stage 208 of the processor pipeline 200) that includes the indirect jump target predictor circuit.

The process 400 includes, responsive to detection 410 of the sequence of instructions, preventing 420 an indirect jump target predictor circuit (e.g., the indirect jump target predictor circuit 132) from generating a target address prediction for the second instruction. For example, preventing 420 the indirect jump target predictor circuit from generating a target address prediction for the second instruction may include, responsive to detection 410 of the sequence of instructions, disabling the indirect jump predictor. In some implementations, preventing 420 the indirect jump target predictor circuit from generating a target address prediction for the second instruction includes updating a status bit in an instruction cache tag, which causes the indirect jump target predictor circuit to be disabled when the second instruction enters a stage of the pipeline (e.g., the F3 stage 208 of the processor pipeline 200) that includes the indirect jump target predictor circuit. In some implementations, preventing 420 the indirect jump target predictor circuit from generating a target address prediction for the second instruction includes updating a status bit in an instruction cache way predictor (e.g., the instruction cache way predictor 252), which causes the indirect jump target predictor circuit to be disabled when the second instruction enters a stage of the pipeline that includes the indirect jump target predictor circuit.

The process 400 includes, responsive to detection 410 of the sequence of instructions, determining 430 a target address for the second instruction before the first instruction is issued to an execution stage of a pipeline of the processor core. For example, the target address for the second instruction may be determined 430 before the first instruction reaches a decode stage of the pipeline (e.g., the processor pipeline 130).

The process 400 includes writing 440 the target address to a fetch target queue (e.g., the fetch target queue 222) that is configured to receive predictions from the indirect jump target predictor circuit. For example, a multiplexor (e.g., the multiplexor 270) may be used to select the target address determined 430 rather than a target address prediction from the indirect jump target predictor circuit.

Figure 6:
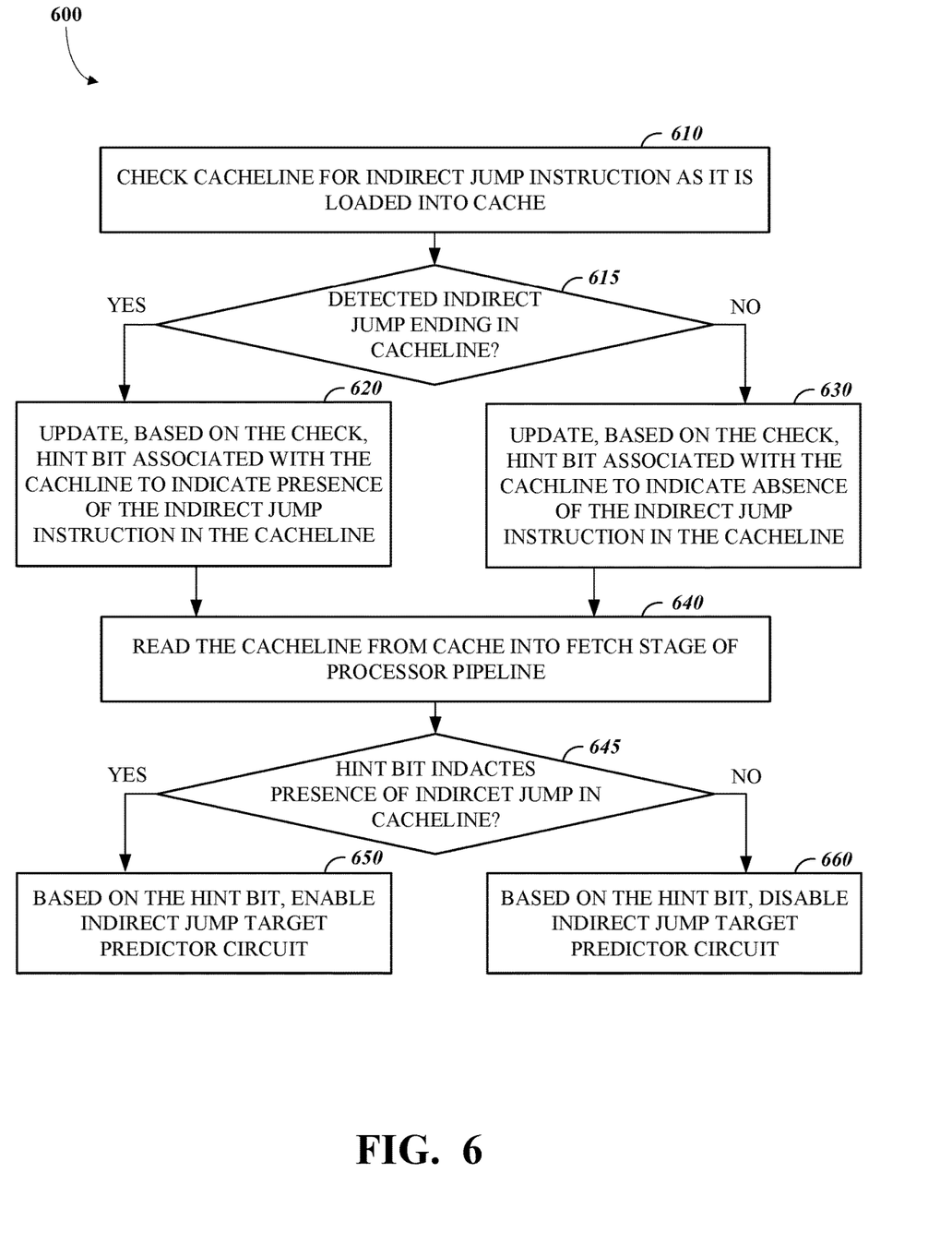
FIG. 6 is a flow chart of an example of a process for selectively disabling an indirect jump target predictor circuit in the absence of indirect jumps.

Although not shown in FIG. 4, the process 400 may be employed in combination with the process 600 of FIG. 6 to further reduce power consumption in an indirect jump target predictor circuit. For example, the process 400 may further include: checking 610 a cacheline for the indirect jump instruction by scanning values appearing on a memory bus as the cacheline is being input to an instruction cache via the memory bus; updating 630, based on the check, a hint bit associated with the cacheline to indicate absence of the indirect jump instruction in the cacheline; and, based on the hint bit, disabling 660 an indirect jump target predictor circuit to prevent the indirect jump target predictor circuit from generating a target address prediction when instructions of the cacheline enter a stage of the pipeline that includes the indirect jump target predictor circuit.

Figure 5:
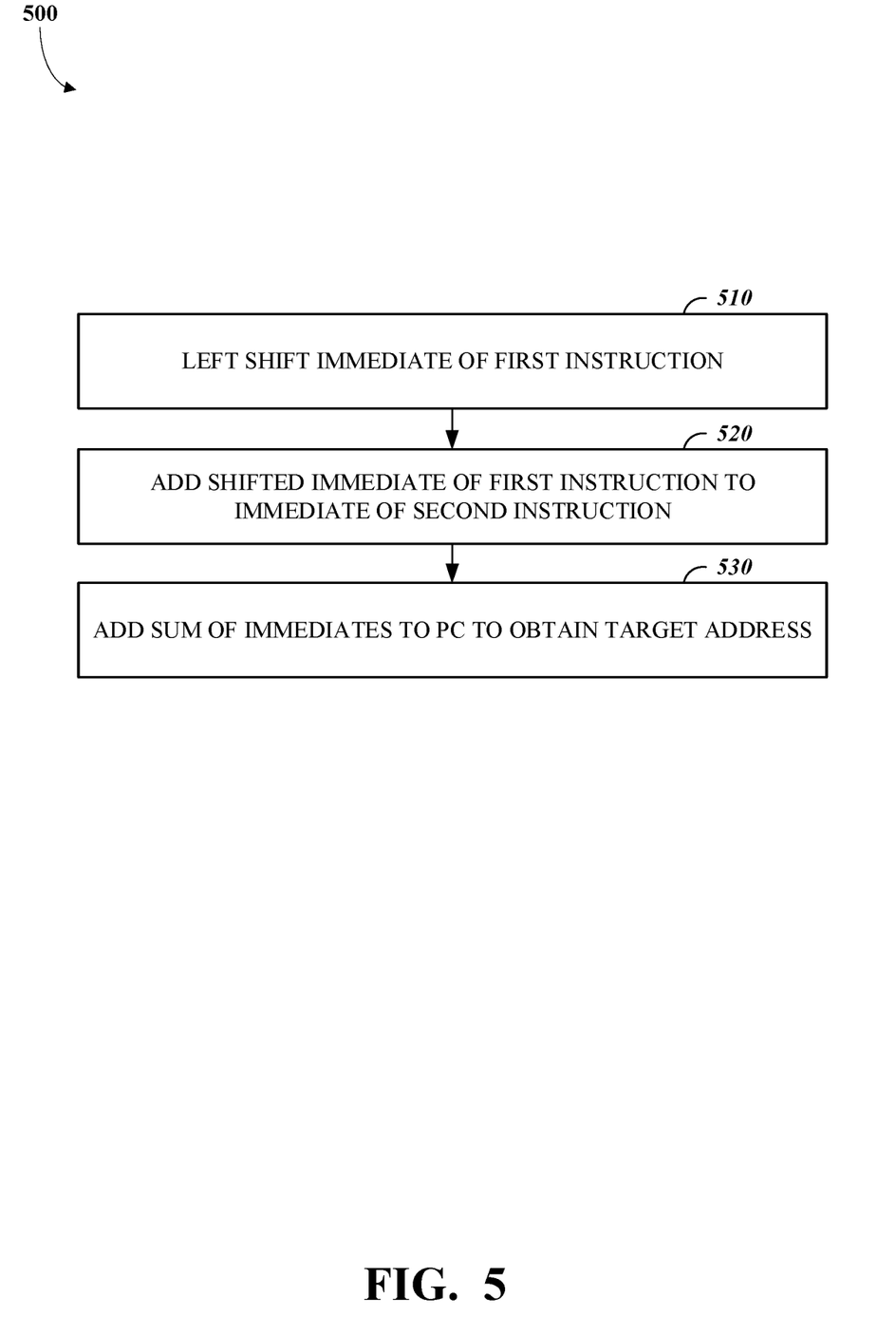
FIG. 5 is a flow chart of an example of a process for determining a target address for an indirect jump instruction that depends on a program counter and one or more immediates of a sequence of instructions.

FIG. 5 is a flow chart of an example of a process 500 for determining a target address for an indirect jump instruction that depends on a program counter and one or more immediates of a sequence of instructions. The process 500 includes left shifting 510 an immediate (e.g., the immediate 316) of a first instruction (e.g., the first instruction 310); adding 520 the shifted immediate of the first instruction to an immediate (e.g., the immediate 326) of a second instruction (e.g., the second instruction 320); and adding 530 the sum of the immediates to a program counter value to obtain a target address. For example, the first instruction may be a RISC V AUIPC instruction and the second instruction may be a RISC-V JALR instruction. For example, the immediate of the first instruction may be left shifted 510 by a number of bits equal to the size of the immediate of the second instruction. In some implementations, the number of the bits of the immediate of the first instruction and the number of bits of the immediate of the second instruction together equal the number of bits of an architectural register of a processor core implementing the process 500. The process 500 may be implemented by a logic circuit of a fetch stage with access to the first instruction and the second instruction as they are stored in a buffer. The steps of the process 500 may be performed in various orders or simultaneously. For example, the shifted unsigned immediate of the first instruction may be added to the program counter value before the immediate of the second instruction is added to the result to obtain the target address. In some implementations (not shown in FIG. 5), the immediate of the second instruction, rather than the immediate of the first instruction, is left shifted before being added in. For example, the process 500 may be implemented using the integrated circuit 110 of FIG. 1. For example, the process 500 may be implemented using the processor pipeline 200 of FIG. 2.

FIG. 6 is a flow chart of an example of a process 600 for selectively disabling an indirect jump target predictor circuit in the absence of indirect jumps. The process 600 includes checking 610 a cacheline for an indirect jump instruction as the cacheline is being input to an instruction cache via the memory bus; if the check detects an indirect jump instruction in the cacheline, updating 620, based on the check, a hint bit associated with the cacheline to indicate presence of the indirect jump instruction in the cacheline; if the check does not detect an indirect jump instruction in the cacheline, updating 630, based on the check, a hint bit associated with the cacheline to indicate absence of the indirect jump instruction in the cacheline; at some later time, reading 640 the cacheline from the cache into a fetch stage of a processor pipeline; if the hint bit indicates presence of an indirect jump instruction in the cacheline, based on the hint bit, enabling 650 an indirect jump target predictor circuit to allow the indirect jump target predictor circuit to generate a target address prediction when instructions of the cacheline enter a stage of the pipeline that includes the indirect jump target predictor circuit; and, if the hint bit indicates absence of an indirect jump instruction in the cacheline, based on the hint bit, disabling 660 an indirect jump target predictor circuit to prevent the indirect jump target predictor circuit from generating a target address prediction when instructions of the cacheline enter a stage of the pipeline that includes the indirect jump target predictor circuit. For example, the process 600 may be implemented using the integrated circuit 110 of FIG. 1.

The process 600 includes checking 610 a cacheline for an indirect jump instruction by scanning values appearing on a memory bus as the cacheline is being input to an instruction cache (e.g., the L1 instruction cache 150) via the memory bus. For example, the indirect jump instruction is a JALR instruction of a RISC V instruction set. In some cases, an indirect jump instruction appears entirely within a single cacheline and checking 610 the cacheline includes detecting the complete indirect jump instruction in the cacheline as it is transferred into the cache. For example, a JALR instruction may be recognized by detecting an opcode within the lower 16 bits of the instruction. In some cases, an indirect jump instruction may cross a cacheline boundary. For example, a lower portion of the instruction may be in a first cacheline and higher portion of the instruction may be in a second cacheline. The order in which these two cachelines is received in the cache may not be guaranteed, which could further complicate checking 610 for the presence of an indirect jump instruction in a cacheline. Special logic may be employed to attempt to check 610 whether an indirect jump instruction (e.g., a JALR) ends in the cacheline being loaded into the cache.

For example, when supporting the C extension of the RISC-V instruction set, it's possible for 32-bit JALR instructions to cross cachelines. As a power optimization, a way predictor may store a hint bit indicating that a JALR instruction likely ends in this cacheline. While fetching, an indirect jump target predictor circuit (e.g., the indirect jump target predictor circuit 132) may only be accessed if the hint bit is set to indicate the presence of a JALR instruction in a cacheline that is being fetched. To generate this hint bit, a miss queue of a cache (e.g., the L1 instruction cache 150) may have some extra logic to scan incoming fill data and detect when JALR instructions may end in this cacheline. For example, parentValid, parentFilled, parent (e.g., a pointer to a miss queue entry for a parent cacheline), and jalrCross entry fields may be used for this purpose. A common scenario is that the fetch unit will generate a cache miss, and then a few sequential prefetches. When a miss queue entry is allocated, the miss queue will check to see if the previously allocated entry is still valid. If so the parentValid field is set to 1 and the parent field is set to the index of the previously allocated entry. The previously allocated entry is referred to as the "parent" entry. If the parent entry fills first, then the parentFilled field is set to one, and the jalrCross field is set to one if the last 16 bits of the parent fill data looks like the lower 16 bits of a 32-bit JALR. When the fill data for an entry comes back, each beat of fill data is also scanned for potential JALR instructions. This is tricky when supporting the C extension because it may not be possible to know if the first 16 bits of the cache block corresponds to the second half of a 32-bit instruction or not. So, both cases may be assumed. When an entry fills, the hint bit is set if any of the following cases is true: (1) When the miss request was made, the fetch pipeline already had the first 16-bits of an RVI instruction and it looks like a JALR. (2) The parent entry was valid and filled first, and the jalrCross bit is set. (3) When this entry's fill data was scanned, we might have a complete JALR instruction.

If (at step 615) an indirect jump instruction ending in the cacheline has been detected, then the process 600 includes updating 620, based on the check 610, a hint bit associated with the cacheline to indicate presence of the indirect jump instruction in the cacheline. If (at step 615) an indirect jump instruction ending in the cacheline has not been detected, then the process 600 includes updating 630, based on the check 610, a hint bit associated with the cacheline to indicate absence of the indirect jump instruction in the cacheline. In some implementations, the hint bit is stored in an instruction cache way predictor (e.g., the instruction cache way predictor 252). In some implementations, the hint bit is stored in an instruction cache tag (e.g., the in the L1 instruction cache 250).

The process 600 includes reading 640 the cacheline from the cache into a fetch stage of a processor pipeline (e.g., the processor pipeline 130). For example, the cacheline may be read 640 out of the cache and rotated as needed before placing instructions of the cacheline in an instruction queue (e.g., the instruction queue 260) for decode.

If (at step 645) the hint bit indicates the presence of an indirect jump instruction ending in the cacheline, then the process 600 includes, based on the hint bit, enabling 650 an indirect jump target predictor circuit (e.g., the indirect jump target predictor circuit 132) to allow the indirect jump target predictor circuit to generate a target address prediction when instructions of the cacheline enter a stage of the pipeline that includes the indirect jump target predictor circuit. If (at step 645) the hint bit indicates the absence of an indirect jump instruction ending in the cacheline, then the process 600 includes, based on the hint bit, disabling 660 the indirect jump target predictor circuit to prevent the indirect jump target predictor circuit from generating a target address prediction when instructions of the cacheline enter a stage of the pipeline that includes the indirect jump target predictor circuit.

Misprediction or errors in the IJTP hit bit may occur and may need to be corrected. For example, when supporting the C extension in a RISC-V processor, it may not be possible to precisely determine when a cache block starts with the second half of a JALR instruction at the time of fill. With multiple misses outstanding, fills may return out of order. If the fetch pipeline detects a JALR instruction while searching for branches and jumps in a later fetch stage of a processor pipeline (e.g., the F3 stage 208 of the processor pipeline 200), but the hint bit read out of the way predictor indicated no JALR instructions, then there was a misprediction. In this case the indirect jump target predictor circuit was disabled and not accessed and there is no valid prediction for that fetch group. In some implementations, this misprediction is handled by treating this as a way predictor misprediction, correcting the UTP hint bit (e.g., in the way predictor), and re-fetching. For example, handling a missed indirect jump instruction as a way predictor misprediction may incur a performance penalty (e.g., a 4-cycle penalty), but is expected to be rare.

In a first aspect, the subject matter described in this specification can be embodied in an integrated circuit for executing instructions that includes a processor core including a pipeline configured to execute instructions, an indirect jump target predictor circuit in a fetch stage of the pipeline configured to generate predictions for target addresses of fetched indirect jump instructions, and an immediate jump handler circuit configured to: detect a sequence of instructions fetched by the processor core, wherein the sequence of instructions includes a first instruction, with a result that depends on an immediate field of the first instruction and a program counter value, followed by a second instruction that is an indirect jump instruction; responsive to detection of the sequence of instructions, prevent the indirect jump target predictor circuit from generating a target address prediction for the second instruction; and, responsive to detection of the sequence of instructions, determine a target address for the second instruction before the first instruction is issued to an execution stage of the pipeline.

In a second aspect, the subject matter described in this specification can be embodied in methods that include detecting a sequence of instructions fetched by a processor core, wherein the sequence of instructions includes a first instruction, with a result that depends on an immediate field of the first instruction and a program counter value, followed by a second instruction that is an indirect jump instruction; responsive to detection of the sequence of instructions, preventing an indirect jump target predictor circuit from generating a target address prediction for the second instruction; and, responsive to detection of the sequence of instructions, determining a target address for the second instruction before the first instruction is issued to an execution stage of a pipeline of the processor core.

In a third aspect, the subject matter described in this specification can be embodied in an integrated circuit for executing instructions that includes a processor core including a pipeline configured to execute instructions of a RISC V instruction set, an indirect jump target predictor circuit in a fetch stage of the pipeline configured to generate predictions for target addresses of fetched indirect jump instructions and output the predictions to a fetch target queue, and an immediate jump handler circuit configured to: detect a sequence of instructions fetched by the processor core, wherein the sequence of instructions includes an AUIPC instruction followed by a JALR instruction; responsive to detection of the sequence of instructions, disable the indirect jump target predictor circuit to prevent the indirect jump target predictor circuit from generating a target address prediction for the JALR instruction; responsive to detection of the sequence of instructions, determine a target address for the JALR instruction before the AUIPC instruction is issued to an execution stage of the pipeline; and write the target address to the fetch target queue in an entry corresponding to the JALR instruction.

In a fourth aspect, the subject matter described in this specification can be embodied in methods that include checking a cacheline for an indirect jump instruction by scanning values appearing on a memory bus as the cacheline is being input to an instruction cache via the memory bus; updating, based on the check, a hint bit associated with the cacheline to indicate absence of the indirect jump instruction in the cacheline; and, based on the hint bit, disabling an indirect jump target predictor circuit to prevent the indirect jump target predictor circuit from generating a target address prediction when instructions of the cacheline enter a stage of a processor pipeline that includes the indirect jump target predictor circuit.

In a fifth aspect, the subject matter described in this specification can be embodied in an integrated circuit for executing instructions that includes a processor core including a pipeline configured to execute instructions, an indirect jump target predictor circuit in a fetch stage of the pipeline configured to generate predictions for target addresses of fetched indirect jump instructions, and an indirect jump detector circuit configured to: check a cacheline for an indirect jump instruction by scanning values appearing on a memory bus as the cacheline is being input to an instruction cache via the memory bus; update, based on the check, a hint bit associated with the cacheline to indicate absence of the indirect jump instruction in the cacheline; and, based on the hint bit, disable the indirect jump target predictor circuit to prevent the indirect jump target predictor circuit from generating a target address prediction when instructions of the cacheline enter a stage of the pipeline that includes the indirect jump target predictor circuit.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:
   a processor core including a pipeline configured to execute instructions;
   an indirect jump target predictor circuit in a fetch stage of the pipeline configured to generate predictions for target addresses of fetched indirect jump instructions; and an immediate jump handler circuit configured to:
  detect a sequence of instructions fetched by the processor core in a fetch stage of the pipeline, wherein the sequence of instructions includes a first instruction, with a result that depends on an immediate field of the first instruction and a program counter value, followed by a second instruction that is an indirect jump instruction;
  responsive to the detection of the sequence of instructions, prevent the indirect jump target predictor circuit from generating a target address prediction for the second instruction; and
  responsive to the detection of the sequence of instructions, determine, based on the immediate field of the first instruction and the program counter value, a target address for the second instruction before the first instruction is issued to an execution stage of the pipeline.

2. The integrated circuit of claim 1, in which the immediate jump handler circuit detects the sequence of instructions before they enter the fetch stage that includes the indirect jump target predictor circuit, and the immediate jump handler circuit is configured to:
  responsive to detection of the sequence of instructions, disable the indirect jump target predictor circuit.

3. The integrated circuit of claim 1, in which the pipeline includes multiple fetch stages, the immediate jump handler circuit detects the sequence of instructions as they pass through an early fetch stage that is earlier in the pipeline than the fetch stage that includes the indirect jump target predictor circuit, and the immediate jump handler circuit is configured to:
  responsive to detection of the sequence of instructions, disable the indirect jump target predictor circuit.

4. The integrated circuit of claim 1, in which the immediate jump handler circuit is configured to update a status bit in an instruction cache tag, which causes the indirect jump target predictor circuit to be disabled when the second instruction enters the fetch stage of the pipeline that includes the indirect jump target predictor circuit.

5. The integrated circuit of claim 1, in which the immediate jump handler circuit is configured to update a status bit in an instruction cache way predictor, which causes the indirect jump target predictor circuit to be disabled when the second instruction enters the fetch stage of the pipeline that includes the indirect jump target predictor circuit.

6. The integrated circuit of claim 1, in which the immediate jump handler circuit is configured to detect the sequence of instructions by scanning values appearing on a memory bus as instructions are being input to an instruction cache via the memory bus.

7. The integrated circuit of claim 1, in which the immediate jump handler circuit is configured to detect the sequence of instructions by scanning values stored in a cacheline of an instruction cache.

8. The integrated circuit of claim 1, in which the immediate jump handler circuit is configured to write the target address to a fetch target queue that is configured to receive predictions from the indirect jump target predictor circuit.

9. The integrated circuit of claim 1, in which the target address for the second instruction is determined before the first instruction reaches a decode stage of the pipeline.

10. The integrated circuit of claim 1, in which the processor core is configured to execute instructions of a RISC V instruction set and the first instruction is an AUIPC instruction and the second instruction is a JALR instruction.

11. A method comprising:
  detecting a sequence of instructions fetched by a processor core in a fetch stage of a pipeline, wherein the sequence of instructions includes a first instruction, with a result that depends on an immediate field of the first instruction and a program counter value, followed by a second instruction that is an indirect jump instruction;
  responsive to the detection of the sequence of instructions, preventing an indirect jump target predictor circuit from generating a target address prediction for the second instruction; and
  responsive to the detection of the sequence of instructions, determining, based on the immediate field of the first instruction and the program counter value, a target address for the second instruction before the first instruction is issued to an execution stage of the pipeline of the processor core.

12. The method of claim 11, in which the sequence of instructions is detected before they enter a fetch stage that includes the indirect jump target predictor circuit, and in which preventing the indirect jump target predictor circuit from generating a target address prediction for the second instruction comprises:
  responsive to detection of the sequence of instructions, disabling the indirect jump target predictor circuit.

13. The method of claim 11, in which the pipeline includes multiple fetch stages, the sequence of instructions is detected as they pass through an early fetch stage that is earlier in the pipeline than a fetch stage that includes the indirect jump target predictor circuit, and in which preventing the indirect jump target predictor circuit from generating a target address prediction for the second instruction comprises:
  responsive to detection of the sequence of instructions, disabling the indirect jump target predictor circuit.

14. The method of claim 11, in which preventing the indirect jump target predictor circuit from generating a target address prediction for the second instruction comprises:
  updating a status bit in an instruction cache tag, which causes the indirect jump target predictor circuit to be disabled when the second instruction enters a stage of the pipeline that includes the indirect jump target predictor circuit.

15. The method of claim 11, in which preventing the indirect jump target predictor circuit from generating a target address prediction for the second instruction comprises:
  updating a status bit in an instruction cache way predictor, which causes the indirect jump target predictor circuit to be disabled when the second instruction enters a stage of the pipeline that includes the indirect jump target predictor circuit.

16. The method of claim 11, in which the detecting the sequence of instructions fetched by the processor core comprises:
  detecting the sequence of instructions by scanning values appearing on a memory bus as instructions are being input to an instruction cache via the memory bus.

17. The method of claim 11, comprising:
  writing the target address to a fetch target queue that is configured to receive predictions from the indirect jump target predictor circuit.

18. The method of claim 11, comprising:
  checking a cacheline for the indirect jump instruction by scanning values appearing on a memory bus as the cacheline is being input to an instruction cache via the memory bus;

updating, based on the check, a hint bit associated with the cacheline to indicate absence of the indirect jump instruction in the cacheline; and based on the hint bit, disabling the indirect jump target predictor circuit to prevent the indirect jump target predictor circuit from generating a target address prediction when instructions of the cacheline enter a stage of the pipeline that includes the indirect jump target predictor circuit.

19. An integrated circuit for executing instructions comprising:

a processor core including a pipeline configured to execute instructions of a RISC V instruction set;

an indirect jump target predictor circuit in a fetch stage of the pipeline configured to generate predictions for target addresses of fetched indirect jump instructions and output the predictions to a fetch target queue; and an immediate jump handler circuit configured to:

detect a sequence of instructions fetched by the processor core in a fetch stage of the pipeline, wherein the sequence of instructions includes an AUIPC instruction followed by a JALR instruction;

responsive to the detection of the sequence of instructions, disable the indirect jump target predictor circuit to prevent the indirect jump target predictor circuit from generating a target address prediction for the JALR instruction;

responsive to the detection of the sequence of instructions, determine, based on an immediate field of the AUIPC instruction and a program counter value, a target address for the JALR instruction before the AUIPC instruction is issued to an execution stage of the pipeline; and write the target address to the fetch target queue in an entry corresponding to the JALR instruction.

20. The integrated circuit of claim 19, in which the immediate jump handler circuit is configured to update a status bit in an instruction cache way predictor, which causes the indirect jump target predictor circuit to be disabled when the JALR instruction enters the fetch stage of the pipeline that includes the indirect jump target predictor circuit.

* * * * *